UNITED STATES PATENT OFFICE.

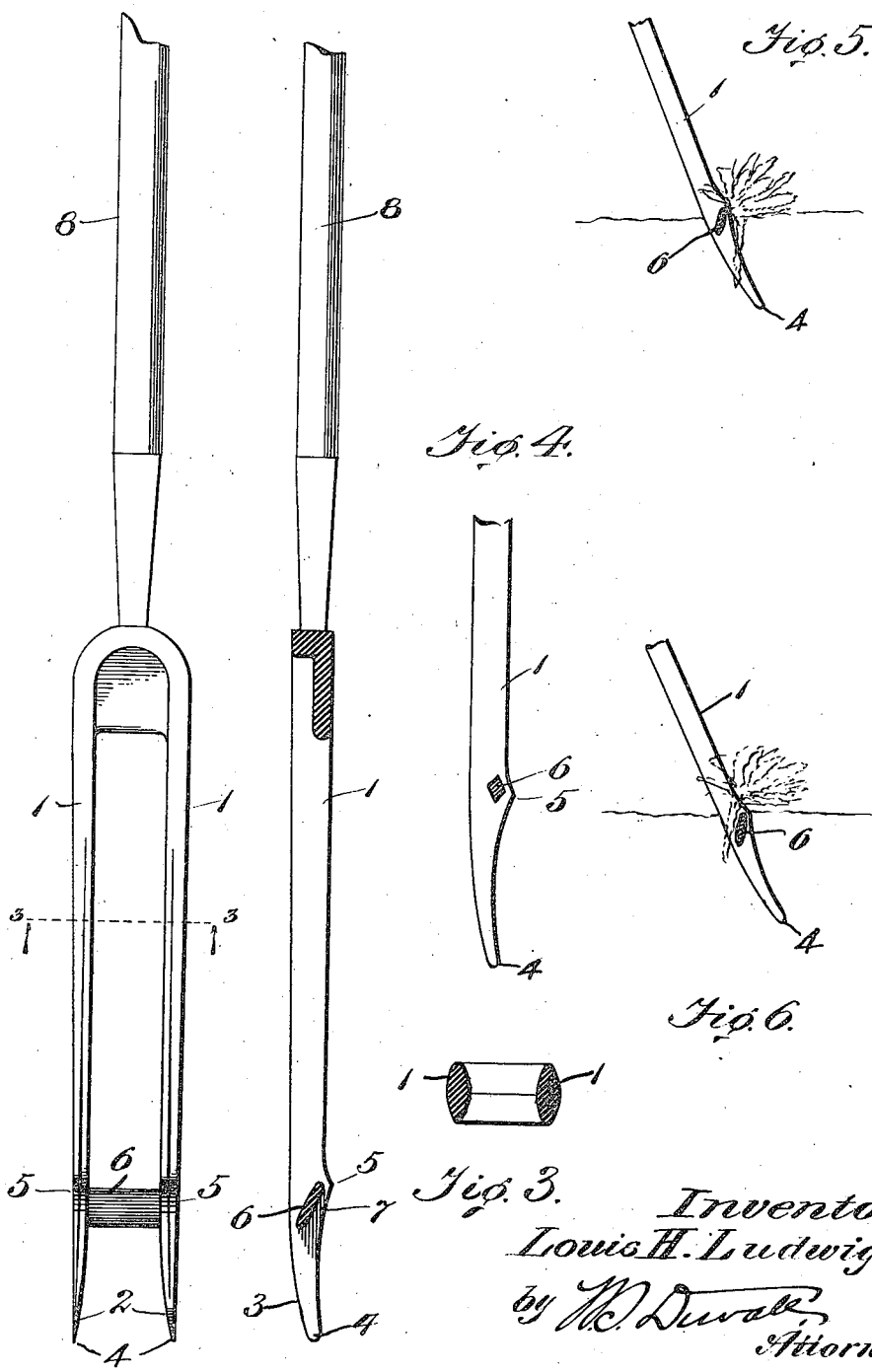

LOUIS H. LUDWIG, OF WAUKEGAN, ILLINOIS.

WEED-PULLER.

1,293,824.  Specification of Letters Patent.  Patented Feb. 11, 1919.

Application filed April 4, 1916, Serial No. 88,811. Renewed July 1, 1918. Serial No. 242,893.

*To all whom it may concern:*

Be it known that I, LOUIS H. LUDWIG, a citizen of the United States, residing at Waukegan, in the county of Lake and State of Illinois, have invented new and useful Weed-Pullers, of which the following is a specification.

My invention relates to agricultural implements, and has special reference to that class thereof known as "weed-pullers."

The principal objects of the invention are to provide a simple and inexpensive device adapted to be conveniently handled and capable of being readily inserted into the ground alongside a weed and which will loosen the soil about the same and withdraw said weed bodily from the ground when the device is withdrawn.

Other objects and advantages of the invention will hereafter appear and the novel features thereof will be particularly pointed out in the appended claims.

Referring to the drawing:

Figure 1 is a front elevation of a weed-puller constructed in accordance with my invention;

Fig. 2 is a vertical longitudinal sectional view of the same;

Fig. 3 is a transverse sectional view on the line 3—3 of Fig. 1;

Fig. 4 is a view similar to Fig. 2, with parts broken away, and illustrating a modified form of my device;

Figs. 5 and 6 are views illustrating the operation of the device and hereinafter more particularly referred to.

Similar numerals of reference indicate similar parts in all the figures of the drawing.

In practising my invention, I employ a fork-shaped frame, the same comprising opposite tines 1, 1, preferably slightly flared at their inner sides and from points a short distance above and to their lower ends, as indicated at 2. The rear edges of the tines are somewhat reduced toward their ends, as at 3, and finally terminate in penetrating-points 4. At their front edges, the tines may be formed with swells or shoulders 5, and opposite these shoulders, the tines are connected by a transverse engaging-bar 6, the same preferably being inclined rearwardly toward its lower edge and in cross-section substantially elliptical. This engaging-bar is preferably also positioned a slight distance back of the front edges of the tines, thus forming at each side of the engaging-bar guide-shoulders 7. Viewed in cross-section (see Fig. 3) the tines are preferably elliptical, though they may be given any other desired shape best adapted for the purposes in view. So, also, may the shape of the engaging-bar be varied, and as an example of one of the many forms it may assume in cross-section, reference is made to Fig. 4, wherein said bar is made substantially diamond-shape. Various other shapes will readily suggest themselves.

The upper end of the device may be fashioned as desired, such forming no part of my invention, and a suitable handle, as 8, may be provided.

Referring now more particularly to Figs. 5 and 6, I have illustrated the operation of the device in connection with the removal of a weed (shown by dotted lines). The penetrating points 4 of the tines are inserted into the soil, one of the tines at each side of the stem of the weed, and therefore said tines embrace the weed. As the tines are forced into the ground, it will be apparent that they loosen the soil at each side of the weed, while the engaging-bar 6 likewise loosens the soil at one side of the weed. As the tines are forced into the ground at a slight inclination, a sufficient penetration of the tines will carry the engaging-bar below the weed, so that as the device is thereafter brought nearer to a vertical position and withdrawn, the engaging-bar will be brought to the opposite side of the stem of the weed, or, in other words, the weed will then be wholly surrounded. As the withdrawal operation begins, the engaging-bar will now loosen the soil at the remaining side of the weed or that side at which the bar is now located, and as the device is withdrawn from the ground the head or foliage of the weed is caught by the engaging-bar as well as the shoulders 5, and, in its loosened condition, the weed is withdrawn, roots and all, with said device, and this too, with a minimum disturbance of the soil. Another method for successfully using my improved weed-puller is after the device has been inserted into the soil and engaged the weed, to give the device a partial twist, thus breaking the soil loose from the weed and its root, and follow this by a withdrawal as before explained.

It will be apparent that the flaring sides 2 near the ends of the tine will serve to guide the weed between the tines, and that the shoulders 7 will also aid in this particular. It is not desirable to cut or separate the weed but to withdraw it as an entirety and thus destroy it for all time. For this reason the engaging-bar 6 has its edges preferably rounded and the bar itself so disposed with relation to the tines that when the latter are being inserted into the soil at a slight inclination, the bar 6 will be substantially vertical, and hence merely loosen the soil from the stem of the weed. It is thus also when the puller is withdrawn, the rounded edge of the engaging-bar slipping loosely up alongside the stem of the weed and serving merely to separate the soil from the same, so that by the time the head of the weed is engaged by the device the weed is loosely held within the soil and readily withdrawn. The device, it will be observed, while most efficacious in removing the weeds yet leaves a hole of comparative insignificance, being but little larger than that caused by the stem of the weed.

It will be understood that the details of the invention may be materially altered from what are herein shown and described, the only essentials being the forked-shaped frame connected at its lower end, or adjacent the same, by a transversely disposed engaging means—preferably in the shape of the bar 7.

Having described my invention, what I claim, is:

1. A weed-puller substantially fork-shaped and consisting of a pair of tines terminating in penetrating ends, and a weed-engaging means connecting said tines.

2. A weed-puller substantially fork-shaped and consisting of a pair of tines terminating in penetrating ends, and a transverse weed-engaging means located between the tines.

3. A weed-puller substantially fork-shaped and consisting of a pair of tines, and a transverse weed-engaging bar, elliptical in cross-section and connecting said tines adjacent their lower ends and disposed at an angle to the tines.

4. A weed-puller comprising a substantially fork-shaped frame having opposite tines flared at their inner faces and toward their lower penetrating ends, and a weed-engaging means connecting said tines.

5. A weed-puller comprising a substantially fork-shaped frame having opposite tines provided at their front edges with weed-engaging shoulders, and a transverse weed-engaging means connecting the tines opposite said shoulders.

6. A weed-puller comprising a substantially fork-shaped frame having opposite tines provided at their front edges above their lower ends with weed-engaging shoulders, and a transverse weed-engaging bar, elliptical in cross-section, connecting the tines, disposed at an angle thereto and spaced from said shoulders.

In testimony whereof I have signed my name to this specification in the presence of two subscribing witnesses.

LOUIS H. LUDWIG.

Witnesses:
W. S. DUVALL,
E. ELLIS.